United States Patent
Dimmling et al.

(10) Patent No.: US 10,604,007 B2
(45) Date of Patent: Mar. 31, 2020

(54) DRIVE-SHAFT ARRANGEMENT FOR USE ON A DRIVE VEHICLE, IN PARTICULAR A TRACTOR, WITH AN AUTOMATIC CLUTCH SYSTEM FOR INTERMEDIATE-AXLE ATTACHMENT UNITS

(71) Applicant: matev GmbH, Langenzenn (DE)

(72) Inventors: Ernst Dimmling, Rosstal (DE);
Albrecht Zschweigert, Nuremberg (DE)

(73) Assignee: matev GmbH, Langenzenn (DE)

(*) Notice: Subject to any disclaimer, the term of this patent is extended or adjusted under 35 U.S.C. 154(b) by 135 days.

(21) Appl. No.: 15/968,861

(22) Filed: May 2, 2018

(65) Prior Publication Data

US 2018/0339587 A1    Nov. 29, 2018

(51) Int. Cl.
*B60K 17/28* (2006.01)

(52) U.S. Cl.
CPC ......... *B60K 17/28* (2013.01); *B60Y 2200/221* (2013.01); *B60Y 2300/1888* (2013.01)

(58) Field of Classification Search
CPC .. B60K 17/28; B60K 5/00; B60Y 2300/1888; B60Y 2200/221; B62D 21/11
See application file for complete search history.

(56) References Cited

U.S. PATENT DOCUMENTS

| | | | | | |
|---|---|---|---|---|---|
| 3,049,929 | A | * | 8/1962 | Wagner | B60K 17/28 74/15.2 |
| 3,921,742 | A | * | 11/1975 | May | B60K 17/28 180/234 |
| 4,403,671 | A | * | 9/1983 | Schmahl | A01B 59/048 180/233 |
| 6,015,019 | A | * | 1/2000 | Grimes | B60K 17/28 180/324 |
| 9,067,493 | B2 | * | 6/2015 | Husson | B60K 6/46 |
| 2011/0040432 | A1 | * | 2/2011 | Kaltenbach | B60K 6/365 701/22 |

FOREIGN PATENT DOCUMENTS

| | | |
|---|---|---|
| DE | 1906354 | 12/1964 |
| EP | 0453038 | 10/1991 |
| EP | 2042013 | 4/2009 |
| JP | 4955833 | 5/1974 |

* cited by examiner

*Primary Examiner* — Faye M Fleming
(74) *Attorney, Agent, or Firm* — Welsh Flaxman & Gitler LLC

(57) ABSTRACT

The invention relates to a drive-shaft arrangement for use on a drive vehicle, in particular a tractor, with an automatic clutch system for intermediate attachment units for providing a front power take-off (PTO) on the drive vehicle, in particular, a tractor with a base frame having at least a front-side first suspension and a rear-side second suspension, a clutch unit arranged on the base frame, a drive-shaft device and a front PTO, wherein the clutch unit is drivingly connected to the front PTO via the drive-shaft device, wherein the first and the second suspensions are designed for the mechanical coupling of the drive-shaft arrangement within an intermediate-axle space of the drive vehicle and the clutch unit is designed for the driving coupling of the front PTO with the automatic clutch system for intermediate-axle attachment units.

10 Claims, 4 Drawing Sheets

DRIVE-SHAFT ARRANGEMENT FOR USE ON A DRIVE VEHICLE, IN PARTICULAR A TRACTOR, WITH AN AUTOMATIC CLUTCH SYSTEM FOR INTERMEDIATE-AXLE ATTACHMENT UNITS

BACKGROUND OF THE INVENTION

The invention relates to a drive-shaft arrangement for use on a drive vehicle, in particular a tractor, with an automatic clutch system for intermediate-axle attachment units and a related drive vehicle.

Drive vehicles for the agricultural and forestry sector, in particular, tractors, are adequately well known with regard to their technical structure and their function. Drive vehicles are known already, which are used less in the agricultural or forestry area, however, mainly used for the maintenance of open spaces, particularly in the municipal sector.

Such drive vehicles or tractors are also known as municipal tractors. Often, these are used for mowing lawns and are then referred to as mowing vehicles or mowing tractors. Common drive vehicles for the municipal sector have a rear power take-off (PTO) powered by the motor of the drive vehicle to mechanically power rear-mounted attachment units and an intermediate-axle PTO to power intermediate-axle working devices. Such intermediate-axle working devices, for example, can be implemented as intermediate-axle mowers, which are attached between the vehicle axles of a mower rack while suspended.

In order to be able to mechanically drive front attachment units, an additional front PTO is required, which, in the case of a variety of drive vehicles, in particular in the municipal sector, is not provided as a standard and therefore would have to be additionally retrofitted if required. Such front PTOs are usually designed as independent engine PTOs, which take power directly at the crankshaft of the combustion engine of the drive vehicle or the tractor. Alternatively, a drive-shaft arrangement can be provided, which comprises a cardan shaft that is connected directly to the intermediate-axle PTO and extends from the intermediate-axle PTO provided in the region of the rear axle to the front of the vehicle. Adversely, the installation of such a drive-shaft arrangement is associated with considerable effort, that being, for example, for installation of such drive-shaft arrangements it is required to remove the back part of the mower rack completely.

In addition, automatic clutch systems for the automatic driving coupling of an intermediate-axle working device to the intermediate-axle PTO of the drive vehicle are already known. In the case of such systems, a mount for a cardan shaft is mounted to the mower rack, which is fixedly installed between the intermediate-axle PTO and the mount. On the free end of the cardan shaft, a profile drive element is provided, by means of which a plug connection between the drive shaft of the intermediate-axle working device and the cardan shaft of the automatic clutch system can be established automatically. For this purpose, the intermediate-axle working device, for example, an intermediate-axle mower is positioned in front of the drive vehicle and then driven over with the front axle so that the intermediate-axle working device is already located in the desired installation position between the front and the rear vehicle axle, therefore being located within the intermediate-axle space. Initially, a mechanical coupling of the intermediate-axle working device, in particular, the intermediate-axle mower is established with the mower suspension. Additionally, via the automatic clutch system or its profile drive element, a driving coupling of the drive shaft of the intermediate-axle working device is established over the cardan shaft, and therefore with the intermediate-axle PTO. From EP 2 042 013 B1, for example, a corresponding automatic clutch system, meaning a PTO coupling for an automatic connection of a working device with a drive vehicle is known.

SUMMARY OF THE INVENTION

Based on this, it is an object of the invention to provide a drive-shaft arrangement for use on a drive vehicle, in particular a tractor, with an automatic clutch system for intermediate-axle attachment units, by means of which a front PTO can be provided on the drive vehicle in a quick and easy manner. In order to solve this object, a drive-shaft arrangement is designed with a drive-shaft arrangement for use on a drive vehicle, with an automatic clutch system for intermediate-axle attachment units for providing a front power take-off on the drive vehicle, comprising a base frame with at least a front-side first suspension and a rear-side second suspension, a clutch unit arranged on the base frame, a drive-shaft device and the front power take-off, wherein the clutch unit is drivingly connected to the front power take-off via the drive-shaft device, wherein the front-side first suspension and the rear-side second suspension are for a mechanical coupling of the drive-shaft arrangement within an intermediate-axle space of the drive vehicle and the clutch unit is for the coupling of the front power take-off with the automatic clutch system for intermediate-axle attachment units One of the important aspects of the invention can be seen in that the drive-shaft arrangement according to the invention is provided for use on a drive vehicle, in particular a tractor, with an automatic clutch system for intermediate-axle attachment units to provide a front PTO on the drive vehicle, in particular a tractor. To this, the drive-shaft arrangement comprises a base frame with at least a front-side first suspension and a rear-side second suspension, a clutch unit arranged on the base frame, a drive-shaft device and a front PTO, wherein the clutch unit is drivingly connected to the front PTO via the drive-shaft device and wherein the first and second suspensions are designed for the mechanical coupling of the drive-shaft arrangement in an intermediate-axle space of the drive vehicle and the clutch unit is designed for drivingly coupling the front PTO to the automatic clutch system for intermediate-axle attachment units. Particularly advantageously the drive-shaft arrangement according to the invention can be coupled to an automatic clutch system similar to an intermediate-axle attachment unit so that a front PTO can be provided on the drive vehicle quickly and easily, which can be used to operate front attachment units on the drive vehicle or tractor. By means of this, time-consuming and costly modifications to the drive vehicle are avoided and it is possible to provide a front PTO according to the needs at hand. The drive-shaft arrangement according to the invention thereby forms a "front PTO adapter", which can be attached to drive vehicles quickly and easily by means of existing automatic clutch systems for intermediate-axle attachment units.

Furthermore, the drive-shaft device favourably has at least one cardan shaft. The cardan shaft is used to produce a driving connection between the clutch unit and the front PTO provided by the drive-shaft arrangement.

In a preferred embodiment, the clutch unit is designed to drivingly connect the drive-shaft device to a cardan shaft of the automatic clutch system via a profile drive element. Preferably, for this purpose, the clutch unit has a drive nozzle or a drive shaft, which can be engaged with the profile drive element of the automatic clutch system. By means of this, the cardan shaft of the automatic clutch system can be connected to the cardan shaft of the drive-shaft arrangement via a simple and preferably automatically established mechanical plug connection in a particularly favourable manner.

Furthermore, it is favourable if the first and second suspension are designed for suspended installation of the base frame within the intermediate-axle space of the drive vehicle. Being particularly advantageous, the suspension is adapted to the holder of the automatic clutch system, which can be formed by a mower rack.

Being further advantageous, the clutch unit can have a shaft unit or a gearing unit or a drive-shaft unit, via which a connection on a drive level is established between the cardan shaft of the drive-shaft device and the drive connection piece or the cardan shaft. As an alternative, the clutch unit can have at least one hydraulic pump and a related hydraulic drive system, wherein, by activating the hydraulic pump via a drive power transmitted by the automatic clutch system a hydraulic pressure is built up in the hydraulic drive system, to operate the front PTO.

In a preferred design variant, the front PTO is connected to the base frame, and this occurs in the area of the front-side first suspension. By means of this, a rigid fixation of the front PTO on the drive vehicle results, which is required for operation.

Being furthermore advantageous, the front PTO of the drive-shaft arrangement is drivingly connected to the intermediate-axle PTO of the drive vehicle, a tractor in particular, via the automatic clutch system. The drive power required drive the front PTO is thereby favourably taken off by the intermediate-axle PTO and transmitted to the front PTO via the automatic clutch system and the clutch unit as well as the downstream drive-shaft device.

In terms of the invention, expressions like "primarily" or "approximately" signify deviations from the respective exact value by +/−10%, preferably by +/−5% and/or deviations in the form of the changes, which are insignificant to the function. In addition, further embodiments, advantages and application possibilities of the invention also result from the following description of the exemplary embodiments and from the figures. Thereby, all described and/or graphically represented features are principally the object of the invention on their own or in any combination, independently of their summarization in the claims or their referral. The contents of the claims will also be made an integral part of the description.

BRIEF DESCRIPTION OF THE DRAWINGS

In the following, the invention will be described in more detail based on the schematic drawings using exemplary embodiment. The figures show.

DETAILED DESCRIPTION OF THE INVENTION

Figure 1:
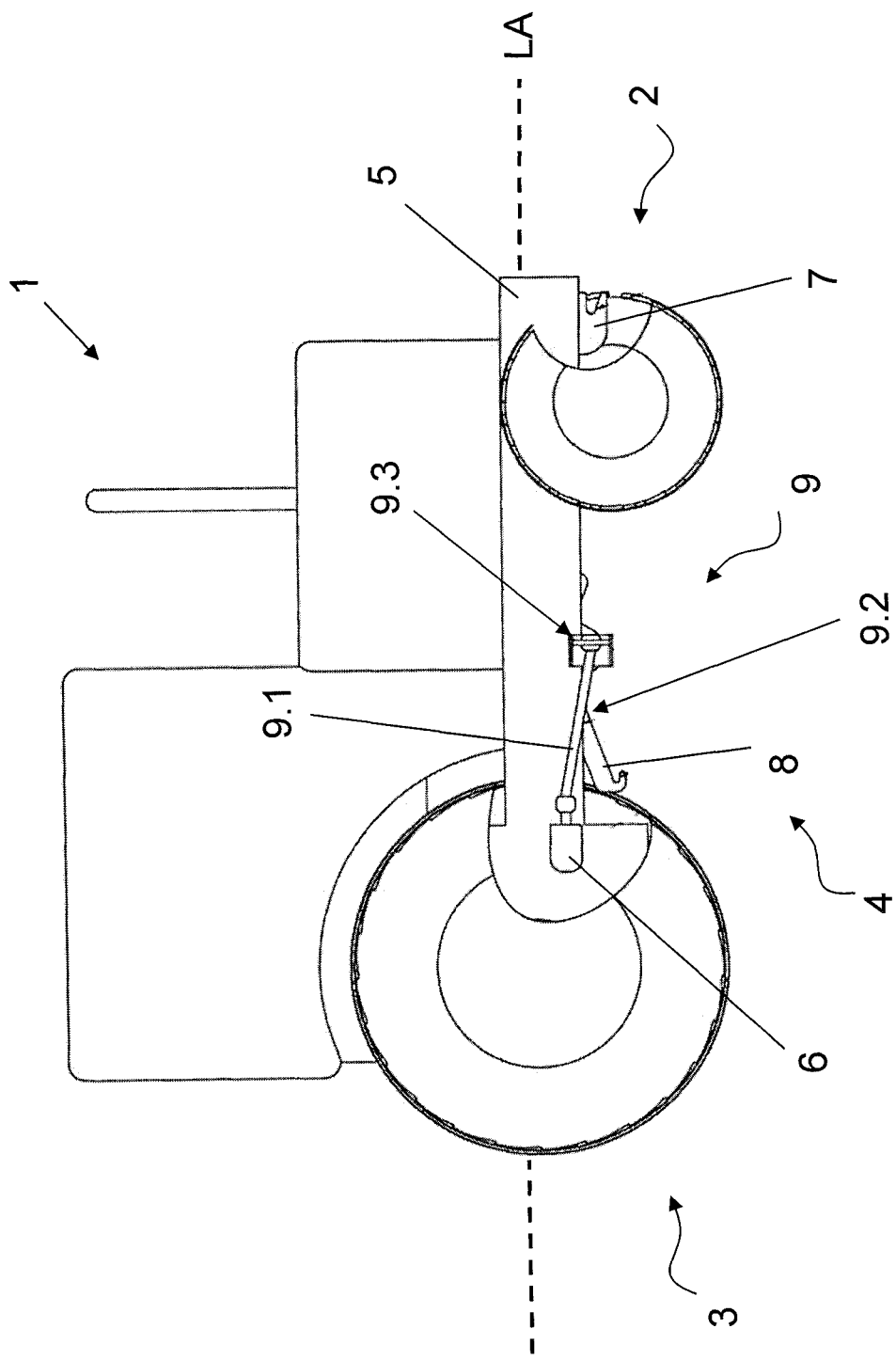
FIG. 1 is a schematic side view of a drive vehicle, in particular a tractor, with an automatic clutch system for an intermediate-axle working device.

In FIG. 1, as an example, a side view of a drive vehicle 1 is shown that is preferably designed in the form of a tractor, namely for use for the municipal sector. In a preferred design variant, the drive vehicle 1 is designed as a mowing vehicle or a mowing tractor.

As an example, the drive vehicle 1 has a front-side wheel axle 2 with two wheels and a rear-side wheel axle 3 also having two wheels, wherein the front-side wheel axle 2 and the rear-side wheel axle 3 are arranged spaced away from each other along the longitudinal axle of the drive vehicle 1, i.e. in the direction of travel and thereby enclose an intermediate-axle space 4. As an example, FIG. 1 shows such a drive vehicle without an intermediate-axle working device accommodated within the intermediate-axle space 4.

The drive vehicle 1 has at least one support frame 5, which supports the front-side and the rear-side wheel axle 2, 3. In the area of the intermediate-axle space 4, for example, the support frame 5 of the drive vehicle 1 is freely accessible and configured to hold an intermediate-axle working device, for example an intermediate-axle mower.

The drive vehicle 1 has an intermediate-axle PTO 6 in the area of the rear-side wheel axle 2, which is, for example, supported by the support frame 5 or is arranged on it. The intermediate-axle PTO 6 is drivingly connected in a known way to the combustion engine of the drive vehicle 1. Furthermore, a rear PTO (not shown in the figures) can be arranged on the rear side.

In order to mount an intermediate-axle working device, in particular, an intermediate-axle mower on the support frame 5 of the drive vehicle 1, a front-side first holder 7 and a rear-side second holder 8 are provided, which are preferably arranged on the support frame 5 or connected to the support frame 5. In the case of an intermediate-axle working device composed of an intermediate-axle mower, the front-side first holder and the rear-side second holder 7, 8 form a mower rack made of several parts.

By means of the front-side first holder and the rear-side second holder 7, 8, a suspended attachment of the intermediate-axle working device, in particular an intermediate-axle mower on the support frame 5 is possible. For this purpose, for example, the first and second holder 7, 8 each have two claw-like holder sections, which are orientated at a distance to each other and are parallel to the longitudinal axle LA of the drive vehicle 1. The first and second holder 7, 8 preferably face downward, i.e. towards the ground and away from the support frame 5 and are therefore easily accessible from the underside of the drive vehicle. Preferably, the claw-like holding sections of the first and second holder 7, 8 each form a holding claw that is open toward the direction of travel, in which a rod-shaped (in a cross section) suspension element or suspension section can be accommodated.

An automatic clutch system 9 is provided for the driving coupling of the intermediate-axle working device to the intermediate-axle PTO 6. For this purpose, the automatic clutch system 9 comprises a cardan shaft 9.1 and an associated mount 9.2, wherein the one free end of the cardan shaft 9.1 is connected to the intermediate-axle PTO 6 and the opposite other free and of the cardan shaft 9.1 is connected to a profile drive element 9.3. The mount 9.2 accommodates the cardan shaft 9.1 in addition to the profile drive element 9.3, by means of which a plug connection can be established between a drive shaft of the intermediate-axle working device and the cardan shaft 9.1.

For the driving coupling of an intermediate-axle working device to the intermediate-axle PTO 6 via the automatic clutch system 9, the intermediate-axle working device, for example, an intermediate-axle mower is positioned in front of the drive vehicle 1 and then driven over with the front-side wheel axle 2 in such a way that the intermediate-axle working device is already located in the desired mounting position between the front-side and rear-side wheel axle 2, 3 within the intermediate-axle space 4. Thereby, an automatic mechanical coupling of the intermediate-axle working device, in particular of the intermediate-axle mower, is established with the first and second holder 7, 8. The driving coupling to the intermediate-axle PTO 6 then takes place via the profile drive element 9.3 of the automatic clutch system 9, which automatically engages with the drive connection pieces of the intermediate-axle working device.

Figure 2:
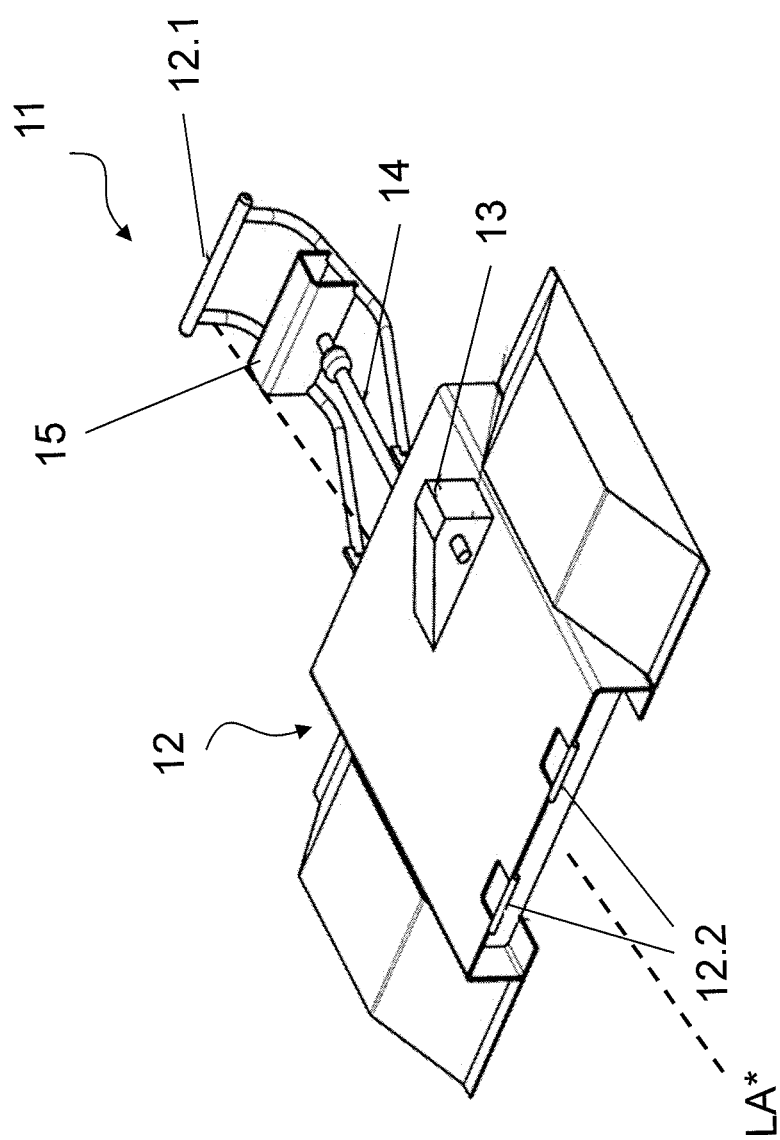
FIG. 2 is a perspective view of an exemplary drive-shaft arrangement according to the invention.
Figure 3:
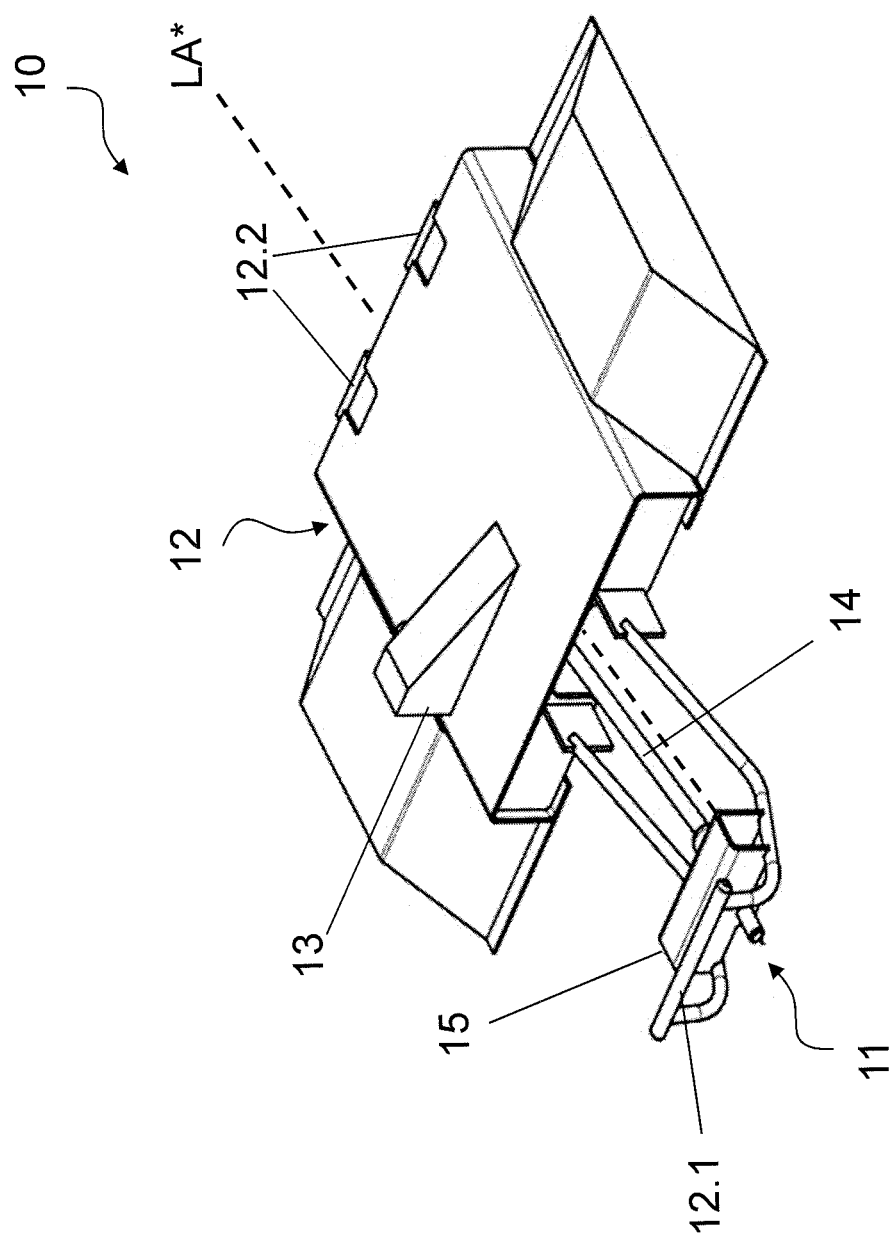
FIG. 3 is another perspective view of the drive-shaft arrangement according to the invention in accordance with FIG. 2 as an example.
Figure 4:
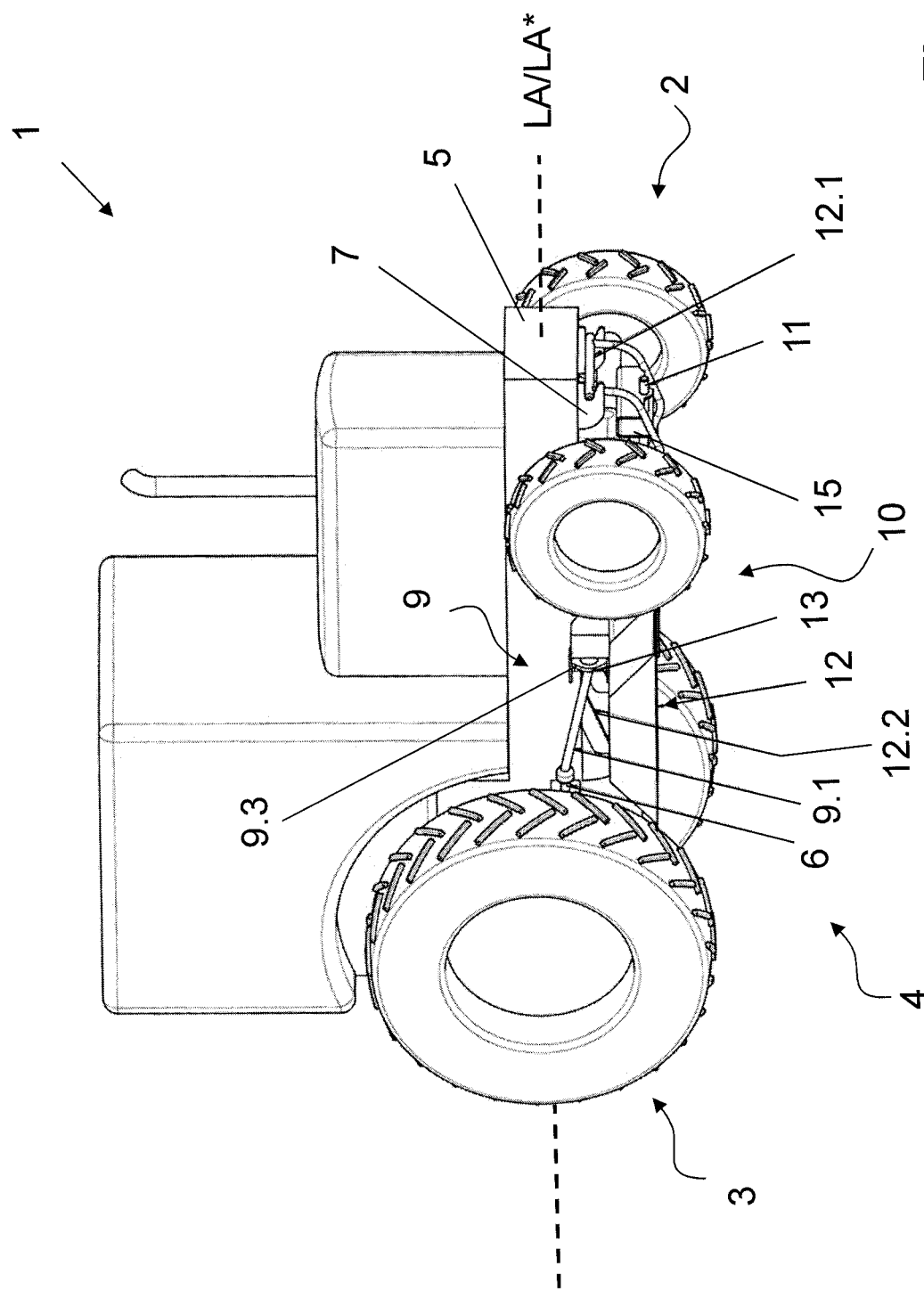
FIG. 4 is a schematic side view of a drive vehicle, in particular a tractor, with an automatic clutch system for an intermediate-axle working device and a drive-shaft arrangement according to the invention connected to the drive vehicle.

This is where the invention comes in. According to the invention, a drive-shaft arrangement 10 is provided to make a front PTO 11 available, which is, for example, shown in two different perspective views in FIGS. 2 and 3. After this, FIG. 4 shows a drive-shaft arrangement 10 according to the invention which is mounted to a drive vehicle 1 in accordance with FIG. 1.

The drive-shaft arrangement 10 comprises a base frame 12, which comprises a front-side first suspension 12.1 and a rear-side second suspension 12.2, wherein the first and the second suspensions 12.1, 12.2 are designed for the mechanical coupling of the drive-shaft arrangement 1 according to the invention in the intermediate-axle space 4 of the drive vehicle 1.

The first and second suspensions 12.1, 12.2 of the base frame 12 are, for example, provided for the suspended mounting to the drive vehicle 1, and preferably to its support frame 5. For example, the first suspension 12.1 is designed for the suspended mounting to the first holder 7 and the second suspension 12.2 is designed for the suspended mounting to the second holder 8. For this purpose, for example, they are shaped like rod sections or rod elements, which are either part of the base frame 12 or fixedly connected to this. The first suspension 12.1 can, for example, be implemented by a bar element, which is arranged on the free ends of at least two bracket-shaped rod elements and is connected to the base frame 12 via this. Hereby, the bar element preferably extends perpendicular to the longitudinal axle LA* of the drive-shaft arrangement 10 and the bracket-shaped rod elements extend along the longitudinal axle LA*. The second holder 8 is, for example, formed by two rod elements, which connect two opposite corner areas of a recess with made into the base frame 12 with each other so that a gripping of the rod elements from the back is possible by means of claw-shaped holding sections.

The drive-shaft arrangement 10 according to the invention furthermore has a clutch unit 13 arranged on the base frame 12 and a drive-shaft device 14 connected to this, wherein the clutch unit 13 is drivingly connected with the front PTO 11 via the drive-shaft device 14. According to the invention, the clutch unit 13 is designed for the driving coupling of the front PTO 11 with the automatic coupling system 9 for intermediate-axle attachment units, meaning the front PTO 11 of the drive-shaft arrangement 10 according to the invention can be drivingly connected to the intermediate-axle PTO 6 of the tractor 1 via the automatic clutch system 9.

The clutch unit 13 is designed for the driving connection to the cardan shaft 9.1 of the automatic clutch system 9 and this, for example as a drive nozzle or a drive shaft, which extends in parallel to the longitudinal axle LA*. This drive nozzle or drive shaft can be engaged with the profile drive element 9.3 of the automatic clutch system 9.

The drive-shaft device 14 has at least one cardan shaft, which is connected to the front PTO 11 on a drive level. Furthermore, the clutch unit 13 can have at least one shaft unit or a gearing unit or a drive-shaft unit, via which the drive connection is established between the cardan shaft and the drive connection piece or the drive shaft.

The drive power transmitted from the cardan shaft 9.1 of the automatic clutch system 9 to the clutch unit 13 can, for example, be transmitted in the clutch unit 13 by means of at least one shaft or a belt or chain drive or a gear drive or by means of a hydraulic power transmission system. In one design variant, the power transmission takes place by means of a shaft, which is drivingly connected to the cardan shaft of the drive-shaft device 14 and this transmits the drive power to the front PTO 11.

In an alternative design variant, the clutch unit 13 has a belt or chain drive, where power transmission takes place by means of a belt, for example, a toothed belt, V-belt or flat belt or a chain, for example, a roller chain or a toothed chain, which transmits the assumed drive power to the cardan shaft of the drive-shaft device 14. Beneficially, in the case of this design variant, a change in rotational speed is possible.

In accordance with another design variant, the clutch unit 13 can have a gear drive, by means of which the drive power is transmitted to the cardan shaft of the drive-shaft device 14. Beneficially, by means of this a change in rotational speed and rotational direction are possible.

As an alternative, the clutch unit 13 can have a hydraulic pump and an associated hydraulic drive system, wherein, by activating the hydraulic pump in the hydraulic drive system via the drive power, a hydraulic pressure is built up, via which the propulsion of the front PTO 11 occurs.

It is furthermore beneficial if the front PTO 11 is fixedly connected to the base frame 12, namely in the area of the front-side first suspension 12.1. For example, a holding element 15 is provided that is permanently connected to the bracket-like rod elements located opposite to each other, in which the front PTO 11 is held and guided.

In order to mount the drive-shaft arrangement 10 according to the invention, analogously with an intermediate-axle working device, for example an intermediate-axle mower, this drive-shaft arrangement 10 is positioned in front of the drive vehicle 1 and then driven over with the front wheel axle 2 so that the drive-shaft arrangement 10 is located between the front and rear wheel axle 2, 3. After the mechanical coupling of the base frame 12 to the first and second holder 7, 8 via the first and second suspension 12.1, 12.2, the driving coupling to the cardan shaft 9.1 of the automatic clutch system 9 takes place via the clutch unit 13 and the profile drive element 9.3.

The invention was described in the aforementioned following an exemplary embodiment. It is to be understood that numerous changes and/or modifications of the object of the invention are possible without leaving the scope of the invention's concept.

REFERENCE LIST 1 drive vehicle or mower vehicle
2 front-side wheel axle
3 rear-side wheel axle 4 intermediate-axle space
5 support frame
6 intermediate-axle PTO
7 front-side first holder
8 rear-side second holder
9 automatic clutch system
9.1 cardan shaft
9.2 mount
9.3 profile drive element
10 drive-shaft arrangement
11 front PTO
12 base frame
12.1 first suspension
12.2 second suspension
13 clutch unit
14 drive-shaft device
15 holding unit
LA longitudinal axle of the drive vehicle
LA* longitudinal axle of the drive-shaft arrangement

What is claimed is:

1. A drive-shaft arrangement for use on a drive vehicle, with an automatic clutch system for intermediate-axle attachment units for providing a front power take-off on the drive vehicle, the drive shaft arrangement comprising:
   a base frame with at least a front-side first suspension and a rear-side second suspension,
   a clutch unit arranged on the base frame,
   a drive-shaft device, and
   the front power take-off,
   the clutch unit is connected to the front power take-off via the drive-shaft device,
   wherein the front-side first suspension and the rear-side second suspension mechanically couple the drive-shaft arrangement within an intermediate-axle space of the drive vehicle and the clutch unit couples the front power take-off with the automatic clutch system for the intermediate-axle attachment units.

2. The drive-shaft arrangement according to claim 1, wherein the drive-shaft device has at least one cardan shaft.

3. The drive-shaft arrangement according to claim 2, wherein the clutch unit provides a driving connection of the drive-shaft device to the at least one cardan shaft of the automatic clutch system via a profile drive element.

4. The drive-shaft arrangement according to claim 1, wherein the front-side first suspension and the rear-side second suspension suspended mount the base frame within an intermediate-axle space of the drive vehicle.

5. The drive-shaft arrangement according to claim 3, wherein the clutch unit has a drive nozzle or a drive shaft, which is engaged with a profile drive element of the automatic clutch system.

6. The drive-shaft arrangement according to claim 1, wherein the clutch unit has at least a shaft unit or a gearing unit or a drive-shaft unit, via which a driving connection is established between a drive shaft of the drive-shaft device and the drive nozzle or the drive-shaft.

7. The drive-shaft arrangement according to claim 1, wherein the clutch unit has at least a hydraulic pump and a related hydraulic drive system, wherein, by activating the hydraulic pump via a drive power transmitted by the automatic clutch system, a hydraulic pressure is built up in the hydraulic drive system to operate the front power take-off.

8. The drive-shaft arrangement according to claim 1, wherein the front power take-off is connected to the base frame in an area of the front-side first suspension.

9. The drive-shaft arrangement according to claim 1, wherein the front power take-off of the drive-shaft arrangement is drivingly connected to an intermediate-axle power take-off of the drive vehicle via the automatic clutch system.

10. A drive vehicle with an automatic clutch system for intermediate-axle attachment units, wherein, in order to provide a front power take-off, a drive-shaft arrangement for use on the drive vehicle is provided, the drive vehicle comprising:
   a base frame with at least a front-side first suspension and a rear-side second suspension,
   a clutch unit arranged on the base frame,
   a drive-shaft device, and the front power take-off,
   the clutch unit is connected to the front power take-off via the drive-shaft device,
   wherein the front-side first suspension and the rear-side second suspension mechanically couple the drive-shaft arrangement within an intermediate-axle space of the drive vehicle and the clutch unit couples the front power take-off with the automatic clutch system for the intermediate-axle attachment units that are mechanically and drivingly coupled to the drive vehicle on a level via the automatic clutch system.

* * * * *